United States Patent Office 2,801,933
Patented Aug. 6, 1957

2,801,933
STABILIZED SOILS

Geoffrey W. Meadows, Kennett Square, Pa., assignor to E. I. du Pont de Nemours and Company, Wilmington, Del., a corporation of Delaware No Drawing. Application June 21, 1954,
Serial No. 438,303

5 Claims. (Cl. 106—193)

This invention relates to soils modified to increase their strength, and resistance to breakdown by water and frost, and so render them useful in the construction of roads, airport runways, foundations, walls, blocks, dams, bankings, and the like.

Modification of soils for engineering purposes, such as mentioned above, is known in the art as soil stabilization, and is different than what has recently come to be known as soil conditioning, the treatment of loose or cultivated soil to improve its tilth and thus make it more useful for agricultural purposes.

The desirability of stabilinzing soils by chemical treatment has long been recognized and a variety of substances have been used or suggested for the purpose. Portland cement is a material that has been used. Its use has been suggested, for example, for admixture in minor amount with soil in the construction of "soil-cement" sidewalks and pathways.

Bituminous materials liquefied by heat, dissolved in petroleum solvents or emulsified in water have also found use in soil stabilization. Calcium hydroxide, calcium chloride and combinations of calcium salts with sodium silicate which react in the soil and form gelatinous calcium silicate have been suggested. A solution of potassium dichromate in sulfite waste liquor, and a combination of polymerized asphaltic fuel oil and dehydrated molasses represent recently proposed soil stabilizing materials. The prior art status of chemical soil stabilization has recently been reviewed in more detail by Lambe et al., Chem. Eng. News 32, 488 (1954).

I have discovered new soil stabilization methods which offer advantages over methods suggested heretofore. By use of these new methods, for example, there is obtained a soil structure less subject to changes in volume with change in water content and thereby less subject to distortion by swelling or by cracking as a result of shrinkage; also a soil which has unusual resistance to the disruptive action of freezing and thawing even when fully saturated with water. A further important advantage is that in general smaller amounts of the stabilizing agent are needed to do the job and, therefore, transportation and handling costs are reduced.

Soil stabilization processes are practiced according to this invention by preparing a compacted mixture of the soil and a xanthate of a polysaccharide, the polysaccharide being selected from the group consisting of pentosans and hexosans. For convenience, the soil stabilization agents will be referred to hereinafter more briefly as polysaccharide xanthates.

The polysaccharide xanthates are conveniently prepared by soaking the polysaccharide in an alkali and then treating the alkali polysaccharide which is formed with carbon disulfide. The method is well known with reference to one hexosan, namely, cellulose since it is used to prepare cellulose xanthate in processes for the manufacture of viscose rayon fiber and cellophane. Thus cellulose xanthate salts such as the sodium or potassium salts are made according to such methods, for example, by treating pulped, shredded, or otherwise finely divided cellulose with strong sodium or potassium hydroxide solution and the resulting material is then treated with carbon disulfide. The method and the details of the chemistry involved are fully described in Heuser "The Chemistry of Cellulose," John Wiley and Sons, 1944, chapter 8.

The polysaccharide xanthates employed in the processes of this invention are conveniently represented by the formula $$[C_nH_{2n-2-m}O_{n-1}(CSSA)_m]_x$$

where $n$ is 5 or 6; $m$, which represents the degree of xanthation, is from 0.1 to 3.0, and more preferably from 0.3 to 1.5; $x$ is the degree of polymerization; and A is a metal or other salt forming group, or ester forming group such as methyl, ethyl, etc.

Illustrative of the polysaccharide xanthates useful in the methods of this invention are those obtained by xanthation of cellulose, starches, dextrins, hemi-celluloses, pectins, dextrans, levans, laminarons, agars and xylans. The xanthates can be prepared from these polysaccharides of commerce or more economically they can be prepared by direct xanthation of crudes such as wood pulp, cotton linters, saw dust, corn cobs, seed hulls, straw, sea weed, fruit pulp, sugar beet pulp, bagasse, waste paper, rags, potatoes, wheat, rice and corn.

While xanthates of low molecular weight polysaccharides, both linear and branched, for example those obtained by xanthation of hemi-cellulose from wood and agar from sea weed, may be used, the xanthates of high molecular weight branched polysaccharides such as those obtained by xanthation of starches from corn or potato have greater soil stabilizing activity. Still more preferred because of their greater soil stabilizing activty are the xanthates of hgh molecular weight linear polysaccharides, for example such as those obtained by xanthation of cellulose from cotton linters or wood pulp.

Water solubility is a desired characteristic of the polysaccharide xanthates employed in the methods of this invention and this property is obtained by providing sufficient xanthation of the polysaccharide. With lower molecular weight polymers, water solubility is attained by having as little as an average of 0.1 xanthate groups per saccharide unit while with the higher molecular weight linear polymers somewhat greater xanthation, for example in the order of at least 0.3 xanthate groups per saccharide unit, gives desired water solubility.

The polysaccharide xanthates are employed in the methods of this invention in the form of their salts or esters. Thus the radical A shown in the above formula can be a monovalent cation such as obtained from sodium, potassium, lithium, ammonium, tetramethylammonium, and other quaternary ammonium ions. Polyvalent cationic radicals can also be used, for example, magnesium, calcium, strontium, iron, zinc, aluminum, copper, and barium. The radical A can also be organic so that the resulting compound is a xanthate ester; thus A can be methyl, ethyl, propyl, isopropyl or other organic radical linked to the xanthate radical thru carbon, and more preferably such organic radicals substituted with water solubilizing groups such as hydroxyl or carboxyl are also useful.

The polysaccharide xanthate stabilizing compositions can be applied to the soil according to conventional soil stabilizing techniques for preparing a compacted mixture of soil and a stabilizing agent. One such technique and the one commonly used involves first incorporating the stabilizing agent into the soil in a manner to insure thorough mixing—in short, mixing with the soil the stabilizing agent. In the case, for example, of preparing an airport runway or a road, the soil to be treated can be taken up, mixed with the stabilizing agent and then returned to the ground, leveled, and then compacted by tamping or rolling equipment. In the practice of such method, the stabilizing agent, as added to the soil, can be in the form of a dry powder or in the form of an aqueous solution. Alternatively in the preparation of runways, roads, and the like, the stabilizing agent in dry form can be incorporated directly in the soil by distributing and mixing on the subgrade by means of mechanical equipment, and then compacting.

Where sub-surface treatments are desired, as for example in stabilizing of sub-strata prior to constructing foundations or in the preparation of dam cores, the preparation of the compacted mixture of soil and the stabilizing agent can be effected by permeating the undisturbed earth which is already in compacted form with a solution of the stabilizing agent injected thru pipes driven into the ground.

The presence of free water in the soil is necessary in practicing the soil stabilization processes of the invention. The amount of water needed to give optimum results varies considerably with the kind of soil involved. For best results, one should first run a compaction test on the soil to be treated to determine the optimum water content for that soil; and then adjust the amount of water in the soil as indicated by the test, such adjustment being made either before, during, or shortly after admixture of the stabilizing agent with the soil. Standard compaction test procedures are described by Lambe, Soil Testing For Engineers, chapter V (John Wiley & Sons, 1951).

It will be understood that the pressure used in compacting can be varied widely. For example, pressures from about 200 to 2,000 pounds per square inch can be used in case of rolling; or in terms of compactive energy from about 5,000 to 50,000 ft.-lb./cu. ft. in the case of tamping. In general, the dosage of the polysaccharide xanthate needed to obtain a given degree of stabilization varies inversely with the compacting pressure.

The rate or dosage of application of polysaccharide xanthate to the soil to obtain the desired stabilization will vary with the particular polysaccharide xanthate used, the soil type involved, and the degree of compaction of the soil at the time of treatment or applied to the soil after the treatment with the stabilizing agent as the case may be. In general, satisfactory results will be obtained by applying the stabilizing agent in amounts sufficient to obtain a polysaccharide xanthate concentration in the soil of from about 0.2 to 20% by weight and more usually from about 0.5 to 5% by weight, based on the dry weight of the soil.

The invention is further illustrated by the following examples which show the preparation of a preferred polysaccharide xanthate, the application of such material for stabilizing soil, and the results obtained thereby.

*Example 1*

610 parts by weight of cotton linters having a degree of polymerization of about 1800 were steeped in 10,000 parts by weight of an 18% sodium hydroxide solution for 30 minutes. The resulting alkali cellulose was then pressed to a weight ratio of 2.98:1 based on the original dry cellulose, shredded, and carbon disulfide was added in amount corresponding to 73% by weight based on the initial dry cellulose. Xanthation was carried out with agitation at 25° C. for six hours.

The cellulose xanthate crumbs which formed were dried by heating in an air circulating oven for 1¼ hours at about 70° C., and the product was ground in a hammer mill using a 0.013″ herringbone screen.

The sodium cellulose xanthate powder prepared above contained about 0.65 xanthate group per saccharide unit; thus $m$ in the formula given above was approximately 0.65.

The sodium cellulose xanthate composition prepared as above was applied to soil and evaluated as described below.

The soil used was Christiana sandy subsoil obtained from New Castle, Delaware. The mechanical analysis of the soil showed it to contain 81% sand, 10% silt, and 9% clay. Water was thoroughly worked into the soil to raise the free water content to 17% by weight based on the dry weight of the soil. Then sodium cellulose xanthate product described above was thoroughly mixed into the soil at a dosage of 1% by weight based on the dry weight of the soil. Soil so treated was then compacted in a mold using the Porter Test static compaction procedure. In this procedure, a high rate of compression is applied until 100 p. s. i. is reached and then the sample is compressed further at a rate of 0.10 inch per minute until 1000 p. s. i. is reached at which point the rate of compression is decreased to 0.05 inch per minute until 2000 p. s. i. is reached; the 2000 p. s. i. is maintained for one minute (see Lambe's Soil Testing For Engineers, page 46 (Wiley & Sons, 1951)).

The compressed soil block was permitted to air dry for several days. The unconfined compressive strength of the dry block was found to be 695 p. s. i. (see Lambe, supra, chapter XII). The block was then immersed in water for 15 days. The appearance of the soil block was not significantly altered by this prolonged immersion in water and was found at the end of the 15 day period to have an unconfined compressive strength of 185 p. s. i. In comparison, a dry soil block prepared as described above but without the addition of the sodium cellulose xanthate product disintegrated upon immersion in water in about 10 minutes. Before immersion in water such dry soil block was found to have an unconfined compressive strength of 249 p. s. i.

*Example 2*

Christiana sandy subsoil was treated a at rate of 4% by weight of sodium cellulose xanthate powder as described in the preceding example. The block of treated soil had a dry unconfined compressive strength of 865 p. s. i. and after immersion in water for 15 days, the unconfined compressive strength was 185 p. s. i. In comparison, untreated soil compacted in the same manner had a dry unconfined compressive strength of 249 p. s. i. and the block rapidly disintegrated in water.

*Example 3*

Christiana sandy subsoil was treated at a rate of 4% by weight of sodium cellulose xanthate and compacted as described in Example 1 was air dried and the soil block was then immersed in water. It was subjected to alternate cycles of freezing and thawing. After twenty eight such cycles, the block showed no sign of distortion or cracking.

I claim:

1. A compacted stabilized soil having dispersed therein a xanthate of a polysaccharide, the polysaccharide being selected from the group consisting of pentosans and hexosans.

2. A compacted, stabilized soil having dispersed therein about 0.2% to 20% by weight, based on the dry weight of the soil, of a xanthate of a polysaccharide having from 0.1 to 3.0 xanthate groups per saccharide unit, the polysaccharide being selected from the group consisting of pentosans and hexosans.

3. A compacted, stabilized soil having dispersed therein a cellulose xanthate.

4. A compacted, stabilized soil having dispersed therein a starch xanthate.

5. A compacted, stabilized soil having dispersed therein about 0.5% to 5.0% by weight, based on the dry weight of the soil, of a cellulose xanthate having from 0.3 to 1.5 xanthate unit per cellulose unit.

(References on following page)

References Cited in the file of this patent

UNITED STATES PATENTS

| | | |
|---|---|---|
| 2,080,832 | Osgood et al. | May 18, 1937 |
| 2,107,637 | Lefebvre-Carnot | Feb. 8, 1938 |
| 2,357,124 | Miller | Aug. 29, 1944 |
| 2,369,682 | Miller | Feb. 20, 1945 |
| 2,375,019 | Miller | May 1, 1945 |

FOREIGN PATENTS

| | | |
|---|---|---|
| 18,022 | Great Britain | of 1902 |
| 226,071 | Great Britain | Dec. 18, 1924 |